A. SMITH.
TYPE SETTING AND DISTRIBUTING MACHINE.
APPLICATION FILED NOV. 21, 1910.
1,050,495.
Patented Jan. 14, 1913.
5 SHEETS—SHEET 1.
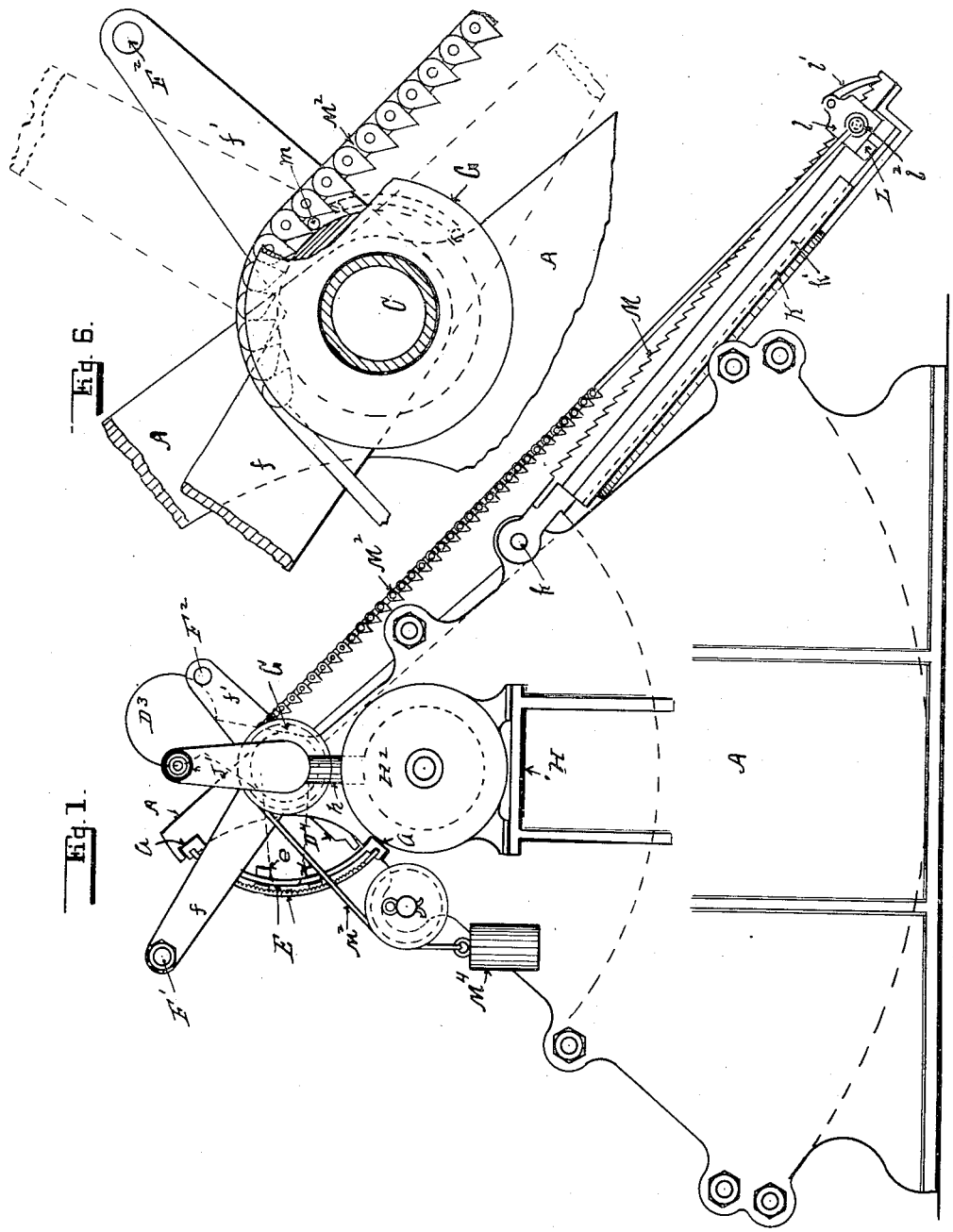
Witnesses.
G. J. Mead
Florence Stockert
Inventor.
Abraham Smith
By A. C. & H. M. Sturgeon
attys
Per, A. C. Sturgeon A. SMITH.
TYPE SETTING AND DISTRIBUTING MACHINE.
APPLICATION FILED NOV. 21, 1910.
1,050,495.
Patented Jan. 14, 1913.
5 SHEETS—SHEET 2.
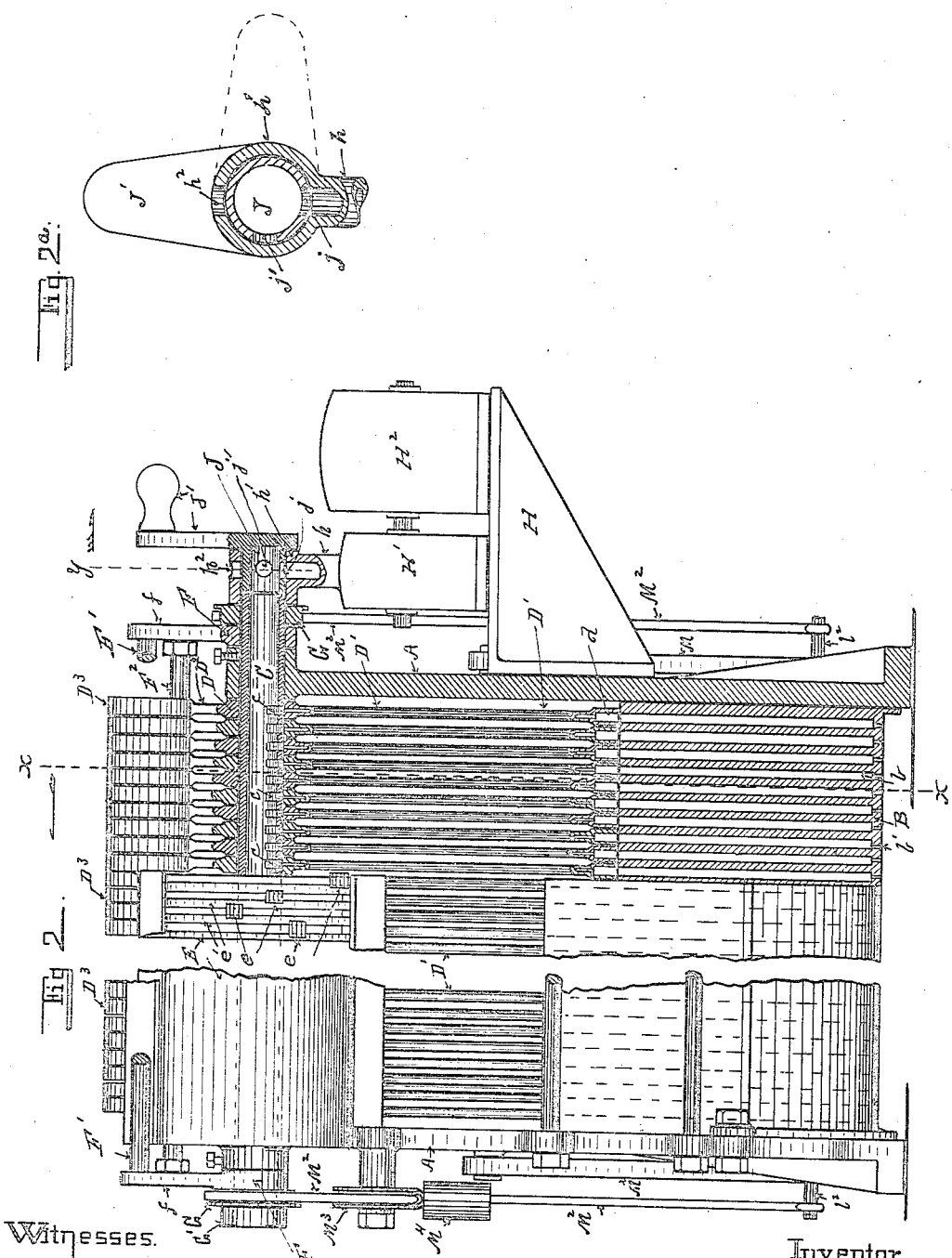

A. SMITH.
TYPE SETTING AND DISTRIBUTING MACHINE.
APPLICATION FILED NOV. 21, 1910.
1,050,495.
Patented Jan. 14, 1913.
5 SHEETS—SHEET 3.
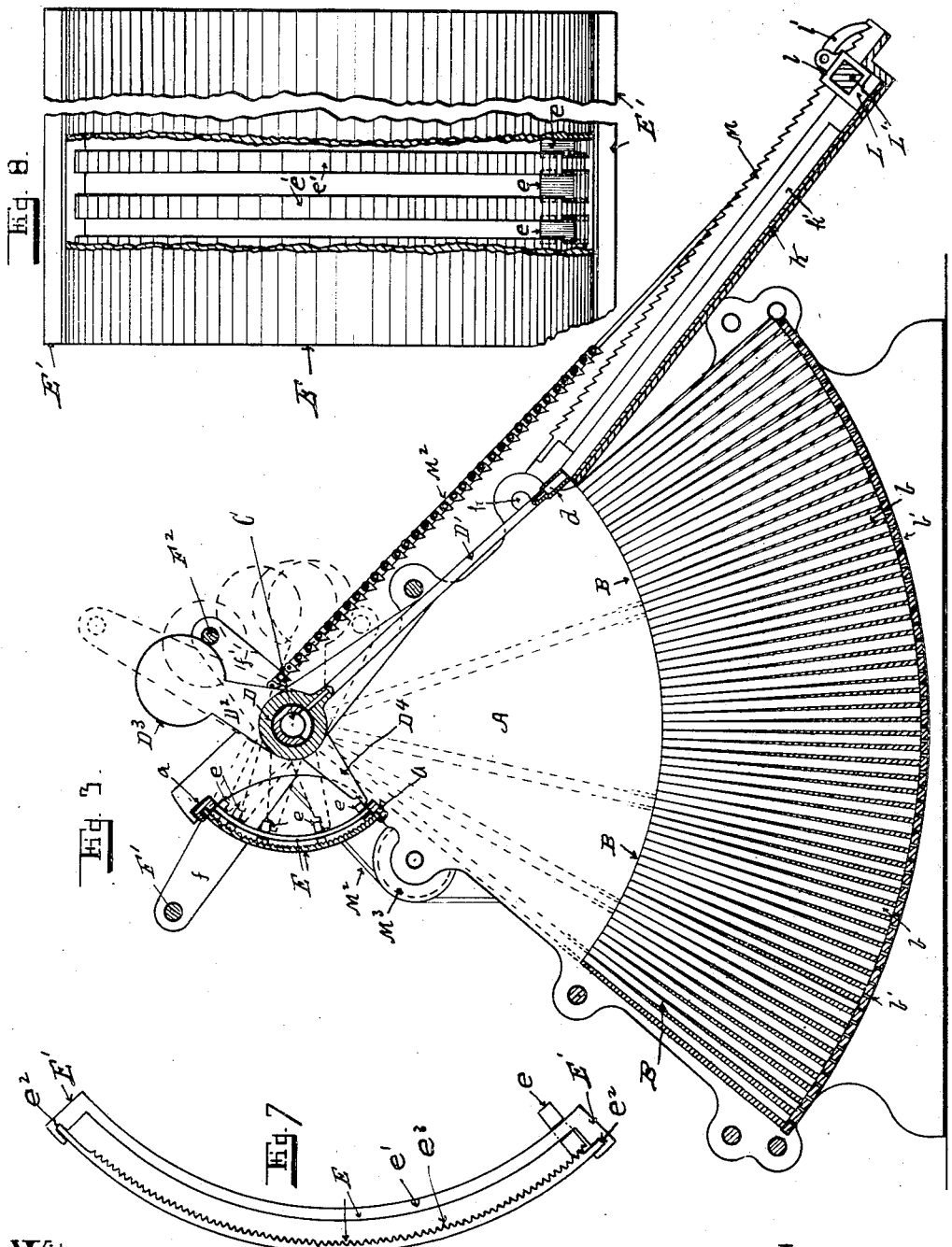

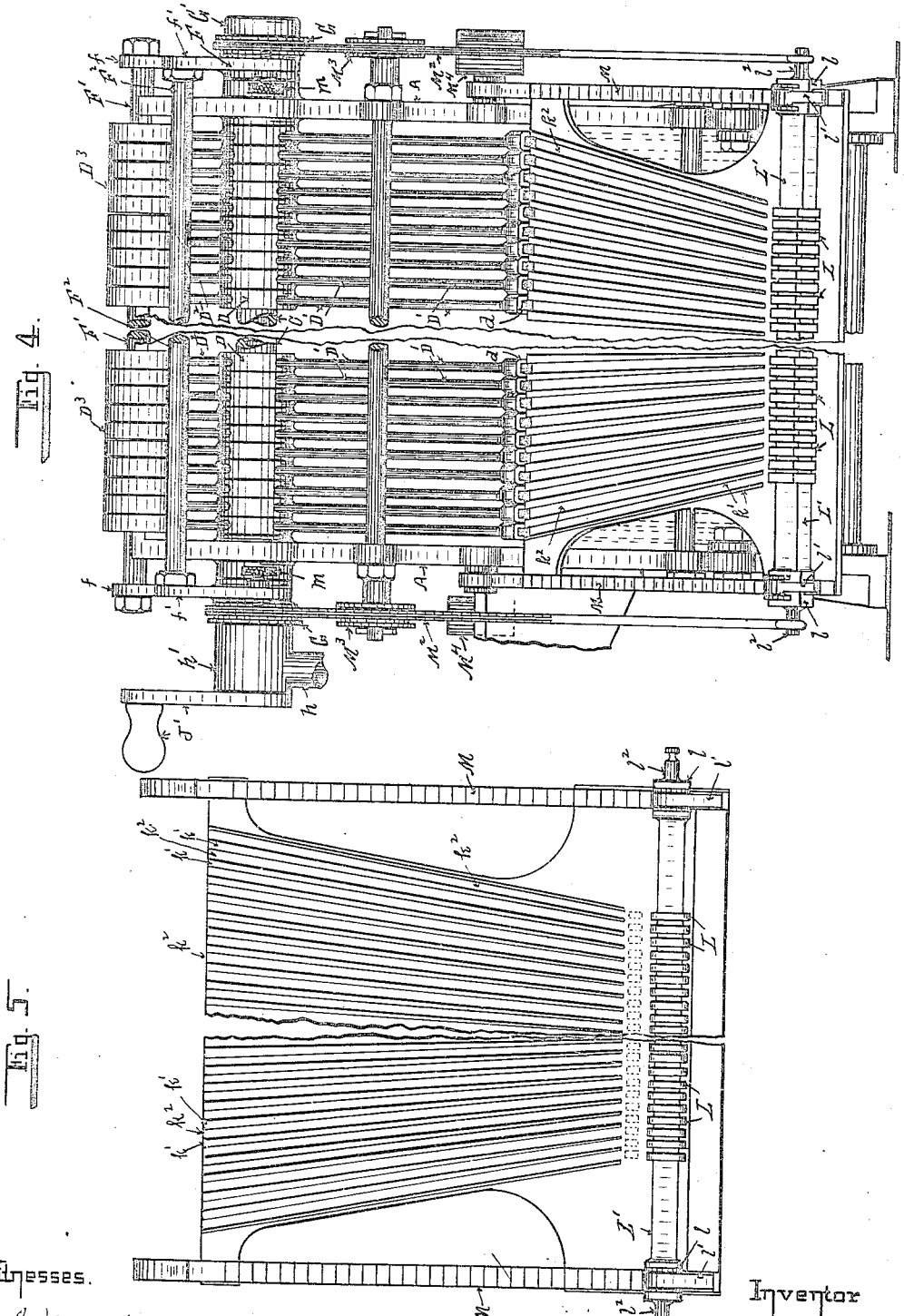

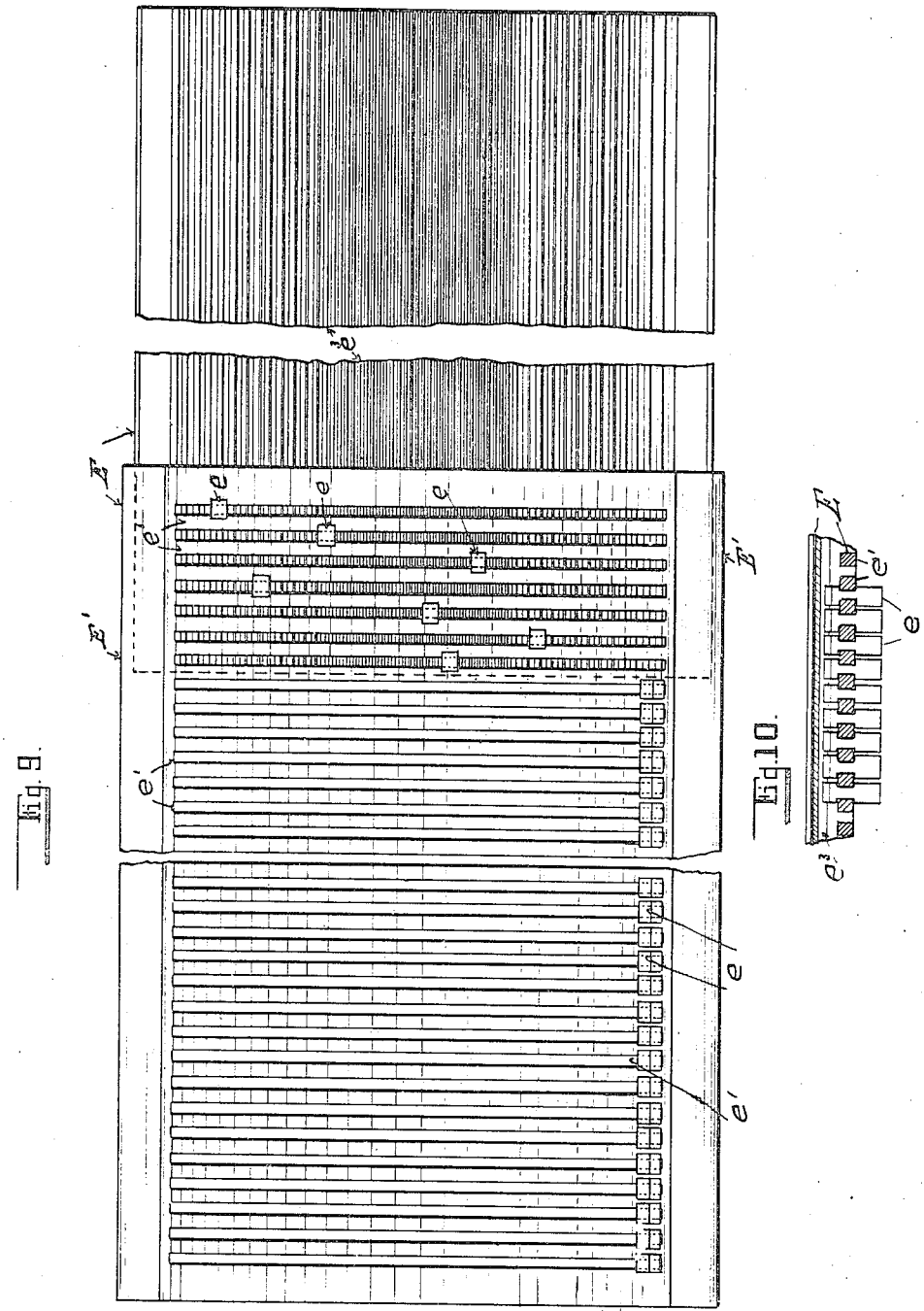

UNITED STATES PATENT OFFICE.

ABRAHAM SMITH, OF ERIE, PENNSYLVANIA.

TYPE SETTING AND DISTRIBUTING MACHINE.

1,050,495.

Specification of Letters Patent.

Patented Jan. 14, 1913.

Application filed November 21, 1910. Serial No. 593,471.

*To all whom it may concern:*

Be it known that I, ABRAHAM SMITH, a citizen of the United States, residing at Erie, in the county of Erie and State of Pennsylvania, have invented certain new and useful Improvements in Type Setting and Distributing Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to type setting and distributing machines and has for its object the construction of a machine controlled by a record element to pick type from a type-case and set them in their proper places in a line, and when desired take them from a line of type and distribute them back into their proper compartments in the type-case from which they were taken.

The features of my invention are hereinafter set forth and explained and illustrated in the accompanying drawings in which:

Figure 1, is an end elevation of my type setting and distributing machine. Fig. 2, is a front view partially in elevation and partially in vertical central section. Fig. 2$^a$, is a fragmentary detail section on the line, $y$, in Fig. 2. Fig. 3, is a section on the line $x$—$x$ in Fig. 2. Fig. 4, is a rear elevation of the same, with parts broken away. Fig. 5, is a plan view of the composing-stick mechanism. Fig. 6, is a fragmentary view showing a detail of a part of the mechanism of my invention. Fig. 7, is an end view of a record plate for controlling the operation of the mechanism. Fig. 8, is a front view of the same with portions thereof broken away. Fig. 9, is a rear view of the same, with a portion of the stops in desired positions for setting and distributing type. Fig. 10, is a sectional fragment of the same.

In these drawings, A, indicates the end plates of my machine upon the lower ends of which the machine stands. Between the lower portions of these plates, A, I secure a series of type-cases, B, preferably in segmental form, each case thereof composed of type compartments or tubes, $b$, which radiate from a common center within the hollow shaft C, mounted and secured in the upper portion of the end plates, A. The type compartments or tubes, $b$, in cross-section, are the shape of a type, and of sufficient size to permit a type to enter endwise and fall to the bottom thereof, each of said compartments, $b$, being designed to be filled with types standing end on end. Each type case B, or row of compartments, $b$, represents a space in a line to be set up and printed. Through the bottom of each of the type compartments, $b$, are small vent openings, $b'$, through which air may enter the compartments, during the process of drawing type therefrom.

In the upper portion of the end plates, A, side thereof, and mounted on this hollow is secured a hollow shaft, C, having a segmental opening or openings, $c$, in the lower shaft, C, between the end plates, A, upon bearing rings, D, is a series of oscillating tubular arms, D', the upper ends of said tubular arms communicating with the openings, $c$, in the wall of the hollow shaft, C, coinciding with the segmental rows of type compartments, $b$. Upon the upper sides of the bearing rings, D, of the tubular arms, D', and slightly to one side of the centers thereof project a series of arms, D$^2$, having at their extremities weights, D$^3$, adapted to cause said tubular arms, D', to oscillate in one direction, and to the opposite side of each of said bearing rings, D, I place a stop-arm, D$^4$, for the purpose hereinafter set forth.

In the front edges of the end plates, A, opposite the hollow shaft, C, I make recesses, $a$, in which is placed a record element, E, hereinafter more fully described, in which is arranged a series of stops, $e$, adapted to engage the stop-arms, D$^4$, at predetermined points in their oscillation.

The lower ends, $d$, of the tubular arms, D', are somewhat enlarged, and the cavities therein given a form in cross-section similar to the form of the type compartments, $b$, and are of a depth sufficient to receive a type thereinto.

Upon each end of the tubular shaft, C, outside of the end plates, A I mount a bell-crank lever, F, and extending across the front of the machine and secured in the arms, $f$, thereof is a hand rod, F', and extending across the rear of the machine below the weights, D$^3$, and secured in the arms, $f'$, of said bell-crank levers, F, is another rod, F$^2$, adapted to raise and lower the weights, D³, when said bell-crank levers are operated. Outside of these bell-crank levers, F, upon the hollow shaft, C, I place small pulleys, G, for the purpose hereinafter set forth. One end of the hollow shaft, C, is closed by means of the cap, G'.

At one side of the machine, preferably upon a bracket, H, I place a suitable suction apparatus, H', and motor mechanism H², to operate the same. From the suction apparatus, H', a tube, h, extends to a collar, h', which embraces the open end of the hollow shaft, C, said collar having an opening, h², in the upper side thereof. Within this collar, h', and against the end of the hollow shaft, C, I place a hollow valve, J, having an opening, j, coinciding with the opening in the tube, h, and another opening, j', adapted when the valve, J, is rotated in the collar, h', to coincide with the opening, h², in the upper side of said collar.

J', indicates the handle for operating the valve, J. When the handle, J', is moved to the position thereof shown by broken lines in Figs. 1 and 2ª, the opening from the hollow shaft, C, into the tube, h, will be closed, and the opening, j', in the valve, J, will coincide with the opening, h², in the top of the collar, h', which will permit air to enter into the cavity of the hollow shaft, C; and when the bell-crank levers, F, are moved to the position thereof shown by full lines in Figs. 1 and 3, all of the weights, D³, stop-arms, D⁴, and tubular arms, D', will be moved to the position thereof shown by full lines in Figs. 1 and 3. If now a record element, E, with the stops, e, thereon properly arranged, is inserted into the recesses, a, in the front edges of the end plates, A, and the bell-crank levers, F, moved to the position thereof indicated by broken lines in Figs. 3 and 6, the weights, D³, will swing downward until the stop-arms on each of said bearing rings D, will contact with a stop, e, on the record element, E, which will cause each of the tubular arms, D', to oscillate toward the front of the machine and stop with its lower end coinciding with the particular type compartment, b, from which it is desired to lift a type. If now, the suction apparatus being in operation, the valve handle, J', is moved to the position thereof indicated by broken lines in Figs. 1 and 2ª, air will be cut off from the hollow shaft, C, and exhausted therefrom and from the tubular arms, D', and types will thereby be drawn upward into the lower ends, d, thereof from the several compartments, b, with which said lower ends, d, then coincide. If now the bell-crank levers, F, are moved to the position thereof indicated by full lines in Fig. 1 and 3, all of the tubular arms, D', will be moved to the position thereof and open ends indicated by full lines in said figures, with their lower ends, d, containing the types clear of one side of the typecases, B. If now the handle, J', is moved back to the position thereof indicated by broken lines in Figs. 1 and 2ª, air entering the hollow shaft, C, through the openings, h², in the top of the collar, h', will release the types contained in the lower ends of the tubular arms, D'.

For receiving the types when they are released from the lower ends, d, of the tubular arms, D', I provide a composing-stick mechanism, K, (see Figs. 1, 3, 4 and 5) the upper end of which is pivoted to the rear edges of the end plates, A, by means of the pivots, k. On the upper face of this mechanism I arrange guide-ribs, k', so as to form runways k² therebetween, the upper ends of which coincide with the openings in the lower ends, d, of the tubular arms, D', as is fully illustrated in Fig. 4, down which runways the types can slide when released from said tubular arms. At the lower ends of the runways, k², I provide a series of stops, L, slidably mounted upon a transverse bar, L, against which stops, L, the types may rest when they emerge from the runways, k², and from which stops the entire line of type may be manually removed and placed in the form from which the printing is desired to be done.

The mechanism and the operation thereof necessary to select the types desired to be set in a particular line having been described, I now proceed to a description of the mechanism for distributing the type back into their appropriate compartments, b, in the cases, B.

At each side of the composing-stick mechanism, K, I place a ratchet-bar, M, having ratchet teeth thereon at intervals corresponding to the length of the types with which the type-cases are filled. Extending transversely across the runways, k², and slightly above the upper edges of the guide-ribs, k', there is mounted upon these ratchet bars, M, by means of suitable slides, l, the transverse bar L', (hereinbefore referred to), and on the upper sides of the slides, l, are pivoted ratchet-dogs, l', adapted to engage the teeth on the ratchet-bars, M. On the outer ends of each slide l, by means of studs, l², I secure one end of a ratchet-chain mechanism, M², which ratchet-chains pass up over the pulleys, G, on the hollow shaft, C, and over the pulleys, M³, pivoted at the front edges of the end plates A, and to the free ends thereof I secure weights, M⁴, which weights are sufficiently heavy to maintain the ratchet-chains in a taut condition. The teeth on these ratchet-chains, M², are at such intervals as correspond with the length of the types in the type-cases, B, of the machine.

Referring to Figs. 4 and 6, I have shown, in the arms, f', of the bell-crank levers, F, thumb-screws, $m$, $m$, which are adapted to be screwed through the arms, $f'$, sufficiently far to engage a tooth in the ratchet-chains, $M^2$, and pull upward thereon so as to slide the transverse bar $L'$, upward on the ratchet bars, M, one notch, when the bell-crank levers, F, are moved to the position thereof indicated by full lines in Figs. 1, 3 and 6, and when the bell-crank levers F, are moved to the position thereof indicated by broken lines, in Figs. 3 and 6, the ratchet-dog, $l'$, engages the teeth on the bars, M, and prevents the bar, $L'$, with the stops L, thereon from moving back downward. The thumb-screws, $m$, $m$, are not in use during the type-setting operation, the same being preferably unscrewed so as not to engage the teeth on the ratchet chains, $M^2$, when the type is being set up.

When a form of type is desired to be distributed, each line of type therefrom is placed by hand consecutively upon the composing-stick mechanism, K, with the lower ends of the types against the stops, L, on the transverse bar, $L'$. The lower end of said mechanism is then preferably raised up until it is in a horizontal position so that the types thereon will not slide by reason of their own gravity, and may be supported in such position by any suitable means. Then each type is moved endwise into the runway, $k^2$, opposite the face end thereof, and then the next consecutive line of type from the form is treated in like manner until the entire form of types are lying on their sides, end to end in the runways, $k^2$, when the transverse bar, $L'$, is moved upward, the stops, L, entering the runways, $k^2$, behind the last types placed therein, with the ratchet-dogs, $l'$, engaging the teeth on the ratchet-bars, M, to prevent said stops from moving backward out of said runways, $k^2$. The support (not shown) is then removed from under the composing-stick mechanism, and the same is lowered to the position thereof shown in the drawings, the weights, $M^4$, drawing the ratchet-chains, $M^2$, taut. The transverse bar, $L'$, is now moved upward on the ratchet-bars, M, until the first or uppermost types in the runways, $k^2$, are even with the upper ends of said runways. If the bell-crank levers, F, are in the position thereof indicated by full lines in Figs. 1, 3 and 6, and the lower ends of the tubular arms, $D'$, adjacent to the upper ends of said runways, and the record element, E, from which the first or upper line of types in the runways, $k^2$, was set, is again inserted in the recesses, $a$, in the front edges of the end plates, A, and the valve handle, $J'$, is moved to the position thereof indicated by full lines in the drawings, the upper row or line of types will be drawn from the runways, $k^2$, into the lower ends, $d$, of said tubular arms, $D'$, and retained there. If now the bell-crank levers, F, are moved to the position thereof indicated by broken lines in Figs. 3 and 6, the weights, $D^3$, will cause the tubular arms to oscillate toward the front of the machine until each one is stopped over the upper end of the type compartment, $b$, into which the type carried thereby is to be dropped, by reason of the stop-arm, $D^4$, contacting with its stop, $e$, in the record-element, E, and when the handle, $J'$, is moved to the position thereof indicated by broken lines in Figs. 1 and 2ª, air entering into the hollow shaft, C, allows the types to drop from the lower ends of said tubular arms, $D'$, into their proper compartments. If now the bell-crank levers, F, are moved to the position thereof indicated by full lines in the drawings, the projecting ends of the thumb-screws, $m$, $m$, will contact with teeth on the ratchet-chains, $M^2$, as shown by broken lines in Fig. 6, and cause said chains to draw the transverse-bar, $L'$, upward one notch on the ratchet-bars, M, thereby causing the next line of types in the runways, $k^2$, to approach near enough the ends, $d$, of the tubular arms, $D'$, which arms are also thereby brought adjacent thereto, that when the valve handle $J'$, is returned to the position thereof indicated by full lines in the drawings, they will be sucked upward into the ends of said tubular arms, ready to be distributed. This operation is to be repeated until the last line of types has been caused to traverse upward in the runways, $k^2$, and has been distributed, when the thumb-screws, $m$, $m$, can be turned backward until their projecting ends no longer engage the teeth of the ratchet-chains, $M^2$, and the transverse-bar, $L'$, moved backward down the ratchet-bars, M, when the machine is again ready for the operation of setting type.

In Figs. 7, 8, 9 and 10, I have illustrated a form of record element, suitable for use in my improved type setting and distributing machine, which hereinbefore has been broadly designated by the reference character, E. This element is composed of a segmental plate, having bars, $e'$, secured together at their ends by upturned transverse bars, $E'$, so as to form slots therebetween. These transverse bars, $E'$, are provided adjacent to their outer edges, with grooves, $e^2$, in which the edges of a corrugated or ribbed segmental plate, $e^3$, are fitted so that the same will slide easily therein. In the slots between the bars, $e'$, are placed a series of stops, $e$, (hereinbefore referred to,) which are provided with grooves on their sides adapted to fit partially around said bars, $e'$, so as to be retained between said bars, and yet to slide freely in the slots. The inner ends of these stops, $e$, are provided with slight projections adapted to fit into the corrugations or ribs on the plate, $e^3$, as shown in Fig. 7. In Fig. 9 I have shown this form of record element in process of arrangement which is as follows: The stop, e, in the first slot is moved to the proper position to select the type desired and then the corrugated plate, $e^3$, is passed into the grooves, $e^2$, far enough to engage the small projections on the inner end of said stop to prevent said stop from further longitudinal movement in its slot; then the next stop in the next succeeding slot is placed in position to select the next desired type, and the plate, $e^3$, moved inward in its grooves until its corrugations engage the projections on that stop, which operation is repeated until stops representing an entire line of types and spaces have been arranged and secured at which time the plate, $e^3$, will have been entirely slid into place in the grooves, $e^2$, and the record element, E, will represent one entire line to be set up and printed. It will be observed from the foregoing that there must be as many record plates E, as there are lines of printed matter to be set up in type, and that these record plates must be numbered to correspond with the lines of type which each plate is to set. Further, when the type is to be replaced, or distributed to their proper compartments, b, these records, E, must be inserted into the recesses, a, in the end plates A, in the same order occupied by the lines of types in the runways, $k^2$, in the composing-stick mechanism, K.

I have hereinbefore shown and described a preferred form of mechanism to accomplish the objects of my invention, but it is obvious to those skilled in the art that many modifications of the same can be made with equally good results in operation without departing from the spirit of my invention. For instance, the records, E, for the lines of type to be set up may be made in other forms, and from other material than that which I have indicated, and the composing-stick mechanism may be composed of tubes in the place of the runways, $k^2$, and the ratchet mechanisms, M, and $M^2$, entirely dispensed with if desired, as well as other changes of like character which may be made in the construction of my invention without departing from the spirit of the same.

Therefore having described the preferred form of mechanism embodying my invention so as to enable others to construct and operate the same, what I claim as new and desire to secure by Letters-Patent is:

1. In a machine of the character described the combination of a type receptacle having an open upper end, a composing stick, and a pneumatic carrier mechanism adapted to lift type from the open upper end of said receptacle and deposit them in said composing stick, substantially as set forth.

2. In a machine of the character described, the combination of a tubular type receptacle adapted to contain type one above the other, a composing stick, and pneumatic mechanism adapted to raise one type at a time from said receptacle and carry it to and deposit it in said composing stick, substantially as set forth.

3. In a machine of the character described the combination of a series of type receptacles, a composing stick, a series of pneumatic carriers adapted to be operated to carry type from said type receptacles and deposit them in said composing stick, and a record element to control the action of said pneumatic carriers, substantially as set forth.

4. In a device of the character described, a type-case composed of type compartments having vents in the bottoms thereof and open ends, a tubular arm adapted to be moved so that one end thereof will pass adjacent to the open end of each of said type-compartments, means to limit the movement of said tubular arm at predetermined points, and means to exhaust air from said tubular arm, substantially as set forth.

5. In a device of the character described, a series of type-cases each composed of type compartments having vents in the bottoms thereof and open ends, a series of tubular arms adapted to be moved so that one end of each of said arms will pass adjacent to the open ends of the type compartments in each of said series of type-cases, means to limit the movement of each of said tubular arms at predetermined points, and means to exhaust air therefrom.

6. In a device of the character described, a segmental type-case composed of radial type compartments having vents in the bottoms thereof and open ends, a tubular arm pivotally mounted at the axis of said segmental type case so that its lower end will pass adjacent to the open ends of said radial type compartments, means to oscillate said tubular arm, means to limit its oscillation at predetermined points, and means to exhaust air therefrom, substantially as set forth.

7. In a device of the character described, a series of segmental type-cases each composed of radial type compartments having vents in the bottoms thereof and open ends, a series of tubular arms pivotally mounted at the common axis of said segmental type-cases so that their lower ends will pass adjacent to the open ends of the compartments in each one of said series of type-cases, means to limit the oscillation of each of said series of tubular arms at predetermined points, and means to exhaust air from said tubular arms, substantially as set forth.

8. In a device of the character described, a segmental type-case composed of radial type compartments having vents in the bottoms thereof and open ends, a hollow shaft mounted at the axis of said segmental type-cases having an opening in the wall thereof, a tubular arm journaled on said hollow shaft so that the lower end thereof is adjacent to the open ends of said radial type compartments and the upper end thereof communicates with the opening in the wall of said hollow shaft, means to limit the movement of said tubular arm at predetermined points, and means to exhaust air from said hollow shaft, substantially as set forth.

9. In a device of the character described, a series of segmental type-cases each composed of radial type compartments having vents in the bottoms thereof and open ends, a hollow shaft mounted at the axis of said segmental type-cases having an opening in the wall thereof, a series of tubular arms journaled on said hollow shaft so that the lower ends thereof will pass adjacent to the open ends of said radial type compartments and the upper ends thereof communicate with the opening in the wall of said hollow shaft, means to limit the oscillation of each of said tubular arms at predetermined points, and means to exhaust air from said hollow shaft, substantially as set forth.

10. In a device of the character described, end plates, a segmental type-case composed of radial type compartments having vents in the bottoms thereof and open ends secured between said end plates, a tubular arm pivotally mounted in said end plates at the axis of said segmental type-case so that its lower end will pass adjacent to the open ends of said radial type compartments, a record element, a stop-arm on said tubular arm, means on said record element adapted to engage said stop-arm to limit the movement of said tubular arm at a predetermined point in its oscillation, means to oscillate said arm, and means to exhaust air from said tubular arm, substantially as set forth.

11. In a device of the character described, end plates, a series of segmental type-cases each composed of radial type compartments having vents in the bottoms thereof and open ends secured between said end plates, a series of tubular arms pivotally mounted at the common axis of said series of segmental type-cases so that the lower ends of said tubular arms will pass adjacent to the open ends of said radial type compartments, a record element secured in said end plates, a stop-arm on each of said tubular arms, means on said record element adapted to engage each of said stop-arms to limit the movement of each of said tubular arms at predetermined points in their oscillations, means to oscillate each of said arms, and means to exhaust air from said arms, substantially as set forth.

12. In a device of the character described, a segmental type-case composed of radial type compartments having vents in the bottoms thereof and open ends, a hollow shaft mounted at the axis of said segmental type-case having an opening in the wall thereof, a tubular arm journaled on said hollow shaft so that the lower end thereof will pass adjacent to the open ends of said radial type compartments and the upper end thereof communicate with the opening in the wall of said hollow shaft, a stop-arm on said tubular arm, a record element, means on said record element adapted to engage said stop-arm to limit the movement of said tubular arm at a predetermined point in its oscillation, means to cause said arm to oscillate, and means to exhaust air from said hollow shaft, substantially as set forth.

13. In a device of the character described, a series of segmental type cases composed of radial type compartments having vents in the bottoms thereof and open ends, a hollow shaft mounted at the axis of said segmental type-cases having an opening in the wall thereof, a series of tubular arms journaled on said tubular shaft so that the lower ends thereof will pass adjacent to the open ends of the radial type compartments in each of said segmental type-cases and the upper ends thereof will communicate with the opening in the wall of said hollow shaft, a stop arm on each of said tubular arms, a record element, a series of means on said record element adapted to engage said stop-arms to limit the movement of said tubular arms at predetermined points, means to oscillate said arms, and means to exhaust air from said hollow shaft, substantially as set forth.

14. In a device of the character described, a type-case composed of type compartments having vents in the bottoms thereof and open ends, a tubular arm adapted to be moved so that one end thereof will pass adjacent to the open end of each of said type compartments, means to limit the movement of said tubular arm, means to exhaust air therefrom, means to move said arm so that the lower end thereof will be clear of said type-case, and means to admit air to said tubular arm, substantially as set forth.

15. In a device of the character described, a series of type-cases each composed of type compartments having vents in the bottoms thereof and open ends, a series of tubular arms adapted to be moved so that one end of each of said arms will pass adjacent to the open ends of the type compartments in each of said series of type-cases, means to limit the movement of each of said tubular arms, means to exhaust air from said tubular arms, means to oscillate said tubular arms so that the lower end of each thereof will stop on a line clear of said series of type-cases, and means to admit air to said tubular arms, substantially as set forth.

16. In a device of the character described, a segmental type-case composed of radial type compartments having vents in the bottoms thereof and open ends, a tubular arm pivotally mounted at the axis of said segmental type-case so that its lower end will pass adjacent to the open ends of said radial type compartments, means to oscillate said tubular arm in one direction, means to limit said oscillation at a predetermined point, means to exhaust air therefrom, means to oscillate said tubular arm in the opposite direction until its lower end will be clear of said type-case, means to admit air to said tubular arm, and means secured on said device to receive a type from the lower end of said tubular arm, substantially as set forth.

17. In a device of the character described, a series of segmental type-cases composed of radial type compartments having vents in the bottoms thereof and open ends, a series of tubular arms pivotally mounted at the common axis of said segmental type cases so that the lower ends thereof will pass adjacent to the open ends of the radial type compartments in each of said type-cases, means to oscillate said tubular arms in one direction, means to limit said oscillation at predetermined points, means to exhaust air from said tubular arms, means to oscillate said tubular arms in the opposite direction until their lower ends stop on a line clear of said type-cases, means to admit air to said tubular arms, and means secured on said device to receive types from the lower ends of said tubular arms, substantially as set forth.

18. In a device of the character described, a type-case composed of type compartments having vents in the bottoms thereof and open ends, a tubular arm adapted to be moved so that one end thereof will pass adjacent to the open ends of each of said compartments, means to limit the movements of said tubular arm at predetermined points, means to exhaust air from said tubular arm, means to move said tubular arm so that its lower end will be clear of said type-case, valve mechanism to admit air to said tubular arm, composing-stick mechanism secured to said device adapted to receive type from said tubular arm, guides on said composing-stick to guide a type to its place in the line of type being set, and means on said composing-stick mechanism adapted to return a type from its place in a line to the lower end of said tubular arm, substantially as set forth.

19. In a composing-stick mechanism for a type-setting and distributing machine, a series of guides adapted to conduct type selected by the type-setting machine to their proper places in a line of type, stops at the lower ends of said guides to receive a series of types, and means for intermittently moving said stops longitudinally upward in said guides, substantially as and for the purpose set forth.

20. In a device of the character described, a composing-stick mechanism, a type receptacle having an open upper end, and a pneumatic carrier adapted to lift type from said composing-stick mechanism and deposit them in said type receptacle.

21. In a device of the character described the combination of a composing-stick mechanism adapted to receive and contain type from a form one above the other, a tubular type receptacle, and a pneumatic carrier adapted to raise one type at a time from said composing-stick mechanism, carry it to and deposit it in said type receptacle, substantially as set forth.

22. In a device of the character described, a composing-stick mechanism adapted to receive and contain type from a form, a series of type receptacles, a series of pneumatic carriers adapted to receive type from said composing-stick mechanism and deposit them in said type receptacles, and a record element to control the action of said pneumatic carriers, substantially as set forth.

23. In a device of the character described, a composing-stick mechanism, a type case composed of type compartments having open ends, a tubular type carrier adapted to be moved so that it will pass adjacent to said composing-stick mechanism and the open ends of said type compartments, means to exhaust air from said tubular type carrier when the lower end thereof is adjacent to said composing-stick mechanism, means to limit the movement of said tubular arm at a predetermined point over said type case, and means to admit air to said tubular arm, substantially as set forth.

24. In a device of the character described, a composing-stick mechanism, a series of type cases each composed of type compartments having open ends, a series of tubular type carriers adapted to be moved so that one end of each of said carriers will pass adjacent to said composing-stick mechanism and to the open ends of the type compartments in each of said type cases, means to exhaust air from said carriers when the lower ends thereof are adjacent to said composing-stick mechanism, means to limit the movement of each of said tubular arms at a predetermined point over each of said type cases, and means to admit air to said tubular arms, substantially as set forth.

25. In a device of the character described, end plates, a series of segmental type cases each composed of radial type compartments having open ends secured side by side between said plates, a hollow shaft mounted in said end plates at the axis of said segmental type-cases having an opening in the wall thereof, a series of tubular arms journaled on said hollow shaft so that their lower ends will pass adjacent to the open ends of the type compartments in said series of type cases and their upper ends communicate with the opening in the wall of said hollow shaft, counter-weights adapted to cause said tubular arms to oscillate in one direction, lever mechanism adapted to oscillate said tubular arms in the opposite direction until their lower ends stop on a line clear of the series of type cases, ratchet bars pivoted to said end plates, a composing stick mechanism secured to said ratchet bars, stop-mechanism slidably mounted on said ratchet-bars adapted to receive the lower ends of types placed thereon, ratchet dogs on said stop mechanism adapted to engage teeth on said ratchet bars, chain mechanism secured to said stop mechanism, pulleys on said end plates for supporting said chains, weights secured to the free ends of said chains, means adapted to intermittently engage said chains to cause the same to move said slidably mounted stop mechanism one notch upward on said ratchet-bars at each oscillation of said tubular arms, guide ribs adapted to guide types resting against said stop mechanism to a point adjacent to the lower ends of each of said tubular arms when the same are on a line clear of said type cases, means to exhaust air from each of said tubular arms, means to limit the opposite oscillation of each of said tubular arms at predetermined points, and means to admit air to said tubular arms, substantially as set forth.

26. In a device of the character described, a record element comprised of a segmental plate having transverse slots therein, stops having projections on one end thereof slidably mounted in said slots, and a longitudinally corrugated segmental plate adapted to engage the projections on said stops slidably secured on said transversely slotted plate, substantially as set forth.

27. In a device of the character described, a record element comprised of a segmental plate having circumferential slots therein and longitudinal slideways in the edges thereof, stop blocks having projections on one end thereof slidably mounted in said slots, and a longitudinally corrugated segmental plate slidably mounted in said slideways adapted to engage the projections on said stop blocks, substantially as set forth.

In testimony whereof I affix my signature, in presence of two witnesses.

ABRAHAM SMITH.

Witnesses:
P. V. GIFFORD,
H. M. STURGEON.